Patented Sept. 11, 1945

2,384,731

UNITED STATES PATENT OFFICE 2,384,731

VULCANIZABLE ISOBUTYLENE-MONOVINYLACETYLENE SYNTHETIC RUBBER

Clarence England Denoon, Jr., Wilmington, Del., assignor to E. I. du Pont de Nemours & Company, Wilmington, Del., a corporation of Delaware No Drawing. Application April 1, 1942,
Serial No. 437,278

7 Claims. (Cl. 260—86)

This invention relates to synthetic rubber-like materials and more particularly to vulcanizable copolymers of isobutylene and monovinylacetylene, and still more particularly to their method of preparation.

Rubbery polymers have been prepared from olefins and particularly from isobutylene. The simple polymers of isobutylene cannot, however, be vulcanized. Certain vulcanizable polymers of isobutylene with butadiene have been prepared.

This invention has an object the preparation of vulcanizable polymers of isobutylene with monovinylacetylene. Other objects will appear hereinafter.

These objects are accomplished by the following invention wherein an insoluble vulcanizable rubbery polymer is prepared by polymerizing a mixture of from 75 to 50% isobutylene with 25 to 50% monovinylacetylene at a temperature below −50° C. in the presence of boron trifluoride as a catalyst.

In carrying out the process of this invention under the preferred conditions, the monomers, for example, a mixture of 25% monovinylacetylene and 75% isobutylene, are placed in a reaction chamber flushed with dry nitrogen, fitted with an inlet tube, a suitable stirrer, and cooled by means of Dry Ice or liquid ethylene to reaction temperatures in the range of −78 to −100° C. It is desirable to add to the reaction mixture about 25% (based on the weight of reactants) of solid pulverized carbon dioxide to aid in controlling the temperature of the exothermic polymerization. While stirring the reaction vigorously, 1% gaseous boron trifluoride is admitted in small portions just above the surface of the agitated liquid. A vigorous exothermic reaction occurs, producing a tough, red, rubber-like material which becomes so stiff that on many occasions agitation of the mixture becomes difficult. After allowing the reaction mixture to stand at this low temperature for periods of time ranging up to 24 hours, the polymer is kneaded with liquid ammonia until the ammonia has destroyed the catalyst. The light yellow, tough, rubbery polymeric material is then removed, washed thoroughly with water on a corrugated mill and dried on a smooth mill at 50° C., adding at this time a small amount of commercial antioxidant such as phenyl-beta-naphthylamine. This polymer is compounded on an ordinary rubber mill with carbon, stearic acid, zinc oxide, zinc dibutyldithiocarbamate, and sulfur and is heated in a mold at 155° C. to obtain a smooth, relatively elastic, rubber-like material.

The more detailed practice of the invention is illustrated by the following examples, wherein parts given are by weight. There are of course many forms of the invention other than these specific embodiments.

Example I

A mixture of 25% monovinylacetylene and 75% isobutylene by weight is placed in a reaction chamber which has been fitted with an inlet tube and a suitable stirrer and has been flushed with dry nitrogen and cooled by means of solid carbon dioxide to approximately −78° C. While stirring the reaction vigorously 1% gaseous boron trifluoride is admitted in small portions just above the surface of the agitated liquid. A vigorous exothermic reaction occurs, producing a tough, red, rubber-like material. The reaction mixture, after standing at this low temperature overnight, is kneaded with liquid ammonia until the ammonia has penetrated the polymer and destroyed the catalyst. The product is washed on a corrugated mill and dried on a smooth mill to yield a yellow, only very slightly tacky, benzene-insoluble isobutylene/monovinylacetylene copolymer (65% yield). This product is compounded using the following formula: Polymer, 100 parts; mercaptobenzothiazole, 0.5 part, stearic acid, 3 parts; zinc dibutyldithiocarbamate, 1 part; zinc oxide, 10 parts; carbon black, 25 parts; and sulfur, 3 parts. This stock, upon heating at 150° C. for one hour, gives a material which displays definite evidence of vulcanization as judged by the tensile strength, the increased elasticity, and the decreased tackiness. The unvulcanized polymers were too plastic to test for tensile strength.

Using an identical procedure, a polymer is prepared from isobutylene alone. In contrast, it is white, tough, and soluble in benzene, chloroform, petroleum ether, and xylene. When it was compounded similarly to the copolymer, it gives no evidence of vulcanization, as judged by its unchanged solubility, its tackiness and its absence of rubber-like properties.

Using the same conditions as above except that a cooling bath of approximately −100° C. is used, copolymers are prepared from mixtures of isobutylene and monovinylacetylene containing 2, 6, 15, 20 and 25% monovinylacetylene in the original monomer mixture. The polymers produced from monomer mixtures containing 2, 6, and 15% monovinylacetylene in isobutylene are yellow sticky gums. That from the 20% monovinylacetylene in isobutylene was tacky and plastic. The copolymer prepared from a monomer mixture of 25% monovinylacetylene in isobutylene is a yellow, rubbery, only slightly tacky isobutylene/monovinylacetylene copolymer obtained in 75% yield.

*Example II*

Using the technique described above with the exception that the polymerization is allowed to proceed for only two hours, a mixture of 25% monovinylacetylene in isobutylene is polymerized to produce a 60% yield of a yellow, strong, rubbery copolymer possessing very little tackiness. The isobutylene/monovinylacetylene copolymer is insoluble in benzene, formic acid, and cresol. By insoluble is meant that a major portion of the polymer does not dissolve in benzene, although minor fractions may dissolve.

*Example III*

Using the same technique as described in Example I, a mixture of 25% monovinylacetylene in isobutylene to which had been added 50% of finely granulated solid carbon dioxide (based on the weight of the polymerizable materials) is polymerized by means of 1% boron trifluoride at −100° C., using a polymerization cycle of three hours. A yellow, strong, nervy, rubbery, benzene-insoluble copolymer is obtained in 68% yield. This polymer is compounded using the following formula: Polymer, 20 parts; carbon black, 10 parts; stearic acid, 0.6 part; zinc oxide, 1 part; zinc dibutyldithiocarbamate, 0.2 part; sulfur, 0.6 part. When the compounded material is heated in a mold at 155° C. for one-half hour, a smooth, elastic product is obtained. On soaking this slab in benzene, the product swells greatly but does not disintegrate as did the unvulcanized control.

*Example IV*

Using the same technique as described in Example I, a mixture of 50 parts of monovinylacetylene, 50 parts of isobutylene, and 25 parts of solid carbon dioxide is treated at −100° C. with 1% boron trifluoride. After a polymerization cycle of three hours, the isolation of the product in the usual manner gives a 55% yield of a yellow, rubbery, only very slightly tacky copolymer of isobutylene and monovinylacetylene. A mixture of 15 parts of copolymer, 7.5 parts of carbon, 0.45 part of stearic acid, 0.75 part of zinc oxide, 0.15 part of zinc dibutyl dithiocarbamate and 0.45 part of sulfur was compounded on a rubber mill. This stock was heated in a mold at 155° C. for 30 minutes to give a vulcanizate of increased tensile strength and decreased tack.

*Example V*

Using the technique described in Example I, a mixture of 10 parts monovinylacetylene, 30 parts of isobutylene, and 20 parts of solid carbon dioxide is treated at −100° C. with 1% boron trifluoride. Instead of working this up in the usual fashion, the reaction mixture is allowed to warm up and the residual unpolymerized gas is distilled and collected in a Dry Ice trap. The residual hydrocarbons (11 parts) contained approximately 69% monovinylacetylene by analysis. This indicates that 2.4 parts of monovinylacetylene remained in the copolymer, corresponding to a copolymer containing about 8% monovinylacetylene in the polymer.

*Example VI*

Using the general technique described in Example I, a mixture of 16 parts of monovinylacetylene, 24 parts of isobutylene, and 10 parts of solid carbon dioxide is treated at −100° C. with 0.3 part of boron trifluoride. After a polymerization cycle of three hours, the product is worked up as described in Example I to obtain a 50% yield of a light-yellow, strong, rubbery copolymer of isobutylene and monovinylacetylene which is insoluble in benzene.

*Example VII*

A blend is prepared from several batches of copolymer made by the polymerization of 25% monovinylacetylene in isobutylene at −100° C. by means of approximately 1% boron trifluoride, and this product is vulcanized using the following formulae and curing cycles. The copolymer can be cured by various methods and under a variety of conditions.

|  | A | B | C |
|---|---|---|---|
| Polymer | 100 | 100 | 100 |
| Tetraethylthiuram disulfide | 1 | | |
| 2-mercaptothiazoline | | .75 | |
| Butyraldehyde-aniline condensation product | | .15 | |
| Mercaptobenzothiazole | | | 1 |
| Phenyl-alpha-naphthylamine | | | 2 |
| Carbon | 41.4 | 41.4 | 51.7 |
| Stearic acid | 3 | 3 | 2 |
| Sulfur | 1.5 | 3 | 5 |
| Curing cycle, minutes at 155° C | 90 | 30 | 180 |
| Tensile, lbs. per sq. in./elongation in percent, at break | 340/800 | 370/850 | 485/780 |
| Percent volume increase in benzene—48 hrs. at 28° C | | | 118 |

*Example VIII*

A blend of several batches of copolymers prepared by polymerizing 40% monovinylacetylene in isobutylene in a manner similar to that of Example VI is made and vulcanized using the following formulae and curing cycles. The copolymer can be cured under a variety of conditions.

|  | A | B | C |
|---|---|---|---|
| Polymer | 100 | 100 | 100 |
| Tetraethylthiuram disulfide | 1 | | |
| 2-mercaptothiazoline | | .75 | |
| Butyraldehyde-aniline condensation product | | .15 | |
| Mercaptobenzothiazole | | | 1 |
| Phenyl-alpha-naphthylamine | | | 2 |
| Carbon | 40.5 | 40.5 | 50.5 |
| Stearic acid | 3 | 3 | 2 |
| Sulfur | 1.5 | 3 | 2 |
| Zinc oxide | 5 | 5 | 5 |
| Curing cycle, minutes at 155° C | 90 | 90 | 90 |
| Tensile/elongation at break; lbs./sq. in./% | 640/640 | 610/520 | 765/660 |

In the process of this invention the proportion of the two polymerizable monomers is of the highest importance.

Monomer mixtures containing less than 25% monovinylacetylene, upon polymerization, give polymers which vary from very tacky gums to semi-liquids and are, in general, not suitable for the production of rubber-like materials. As the proportion of monovinylacetylene in the monomer mixture is increased up to 50% the yield tends to decrease, and beyond 50% becomes particularly unsatisfactory. The yield of polymer becomes negligible toward 100% monovinylacetylene.

The copolymers obtained contain a considerably lower percentage of monovinylacetylene than was present in the monomer mixtures. This is amply illustrated in Example V in which a mixture of 25% monovinylacetylene and 75% isobutylene were polymerized. Although the monovinylacetylene was present in the original monomer mixture in the proportion of 25%, the residual gas by analysis contained 69% monovinylacetylene, indicating that isobutylene polymerized much more readily than the monovinylacetylene and consequently the monovinylacetylene is present in a lower proportion in the copolymer than it is in the original monomer mixture. Although it is difficult to make an exact estimate of the amount of monovinylacetylene present in the copolymer by means of carbon and hydrogen analyses, the data given in Example IV indicate that the copolymer prepared from a 50:50 monomer mixture contains a considerably lower proportion of monovinylacetylene, probably less than 25%.

The preferred reaction temperature is obtained by using exterior cooling in the range of −78° C. to −100° C., with particular preference to the use of the lower temperature (−100° C.). The temperature of the reaction mixture is probably as high as −50 when the bath temperature is −78° C. The use of temperatures considerably below this markedly lowers the rate of reaction. The use of certain internal refrigerants, such as, for example, solid carbon dioxide, is a valuable aid in controlling the temperature of this exothermic reaction, while the use of diluents such as ethylene and pentane is not markedly beneficial.

Boron trifluoride is considerably more effective than metal halide type catalysts such as aluminum chloride or bromide, and accordingly boron trifluoride is the preferred catalyst for accomplishing the copolymerization.

In the isolation and purification of the copolymer, it is desirable to destroy the catalyst before allowing the reaction mixture to rise to room temperature, since allowing the polymerization to warm up before destroying the catalyst frequently causes the polymer to char. Although liquid ammonia has been found most convenient and suitable for destruction of the catalyst, other basic materials such as primary amines, e. g., methylamine, secondary amines such as dimethylamine, and tertiary amines such as dimethylaniline, pyridine, and triethylamine can be employed. If the reaction mixture is allowed to warm to approximately 0° C. before destroying the catalyst, aqueous solutions or dispersions of metallic hydroxides such as sodium hydroxide, potassium hydroxide and lime are suitable. Although an ordinary corrugated roller wash mill and a smooth mill are found convenient for the washing and drying of these polymers, a large number of other devices which are well known in the rubber industry are also appropriate.

The apparatus used when carrying out this copolymerization can be varied within wide limits. It should be insulated in order to maintain low temperatures and should be corrosion-resistant in order to withstand the effect of materials such as boron trifluoride. In order to prevent the occurrence of centers of localized heating and to obtain proper heat exchange it should have suitable arrangements for proper agitation of the polymerization mixture. Since the residual unpolymerized gases contain a relatively large proportion of monovinylacetylene, the apparatus should be designed to permit recovery of the residual gases which are subsequently scrubbed to remove the ammonia, enriched with isobutylene, and recycled.

The products of this invention are insoluble in benzene, xylene and other aromatic hydrocarbons, chloroform, petroleum ether, etc.

In preparing the copolymers of this invention for vulcanization, it is convenient to add accelerators and other compounding ingredients conventionally used in the milling of natural and synthetic rubbers. Generally speaking, the types of fillers and compounding agents to be used will be governed to a considerable extent by the type of vulcanized product desired and by the nature of the copolymer, i. e., by the relative proportions of monovinylacetylene and isobutylene comprising the copolymer. A wide variety of commercial accelerators such as mercaptobenzothiazole, tetraethylthiuram disulfide, zinc dibutyldithiocarbamate, piperidine pentamethylenedithiocarbamate, di-o-tolylguanidine, zinc dimethyldithiocarbamate, and the zinc salt of mercaptobenzothiazole; antioxidants such as phenyl-beta-naphthylamine, phenyl-alpha - naphthylamine, and p-hydroxyphenyl-morpholine; various fillers such as pigments, carbon black, chalk, and clay; and compounding ingredients such as stearic acid, sulfur, and zinc oxide are appropriate for compounding with these copolymers. In general, it may be said that these copolymers may be modified in a manner analogous to natural and synthetic rubber, taking into account the different degree of unsaturation which these copolymers possess.

These copolymers, particularly in the vulcanized state, may be used, as are natural and synthetic rubbers, in the formulation of gaskets, linings for chemical equipment, adhesives, articles of clothing, shoe soles, printers rolls, sponge-type rubber, hollow tubes, and gloves. The copolymers can be calendered on cloth, paper, and other substances. Dispersions of these polymers resembling natural rubber latex can be used in the impregnation and coating of a large variety of material, such as, for example, textiles, metals, other plastics, and wood.

The above description and examples are intended to be illustrative only. Any modification of or variation therefrom which conforms to the spirit of the invention is intended to be included within the scope of the claims.

What is claimed is:

1. Process which comprises agitating, with exterior cooling at −78 to −100° C., an internally refrigerated mixture of one part monovinylacetylene with three parts of isobutylene in contact with boron trifluoride as a catalyst.

2. Process which comprises agitating, with exterior cooling at −78 to −100° C., an internally refrigerated mixture of one part of monovinylacetylene with from one to three parts of isobutylene in contact with boron trifluoride as a catalyst.

3. Process which comprises agitating, with exterior cooling at −78 to −100° C., a mixture consisting essentially of one part of monovinylacetylene with from one to three parts of isobutylene in contact with boron trifluoride as a catalyst.

4. Process which comprises agitating, with exterior cooling at −78 to −100° C., a mixture of one part of monovinylacetylene with from one to three parts of isobutylene in contact with boron trifluoride as a catalyst.

5. Process which comprises agitating at a temperature below −50° C., a mixture of one part of monovinylacetylene with from one to three parts of isobutylene in contact with boron trifluoride as a catalyst.

6. An aromatic-hydrocarbon-insoluble, vulcanizable, rubbery product of the boron trifluoride catalyzed polymerization, at −78 to −100° C. of one part of monovinylacetylene with three parts of isobutylene.

7. An aromatic-hydrocarbon-insoluble, vulcanizable, rubbery product of the boron trifluoride catalyzed polymerization, at a temperature below −50° C. of one part of monovinylacetylene with one to three parts of isobutylene.

CLARENCE ENGLAND DENOON, Jr.